May 15, 1923.
C. A. TILT
1,455,365
AUTOMOBILE ENGINE SUSPENSION
Filed April 27, 1921     2 Sheets-Sheet 1
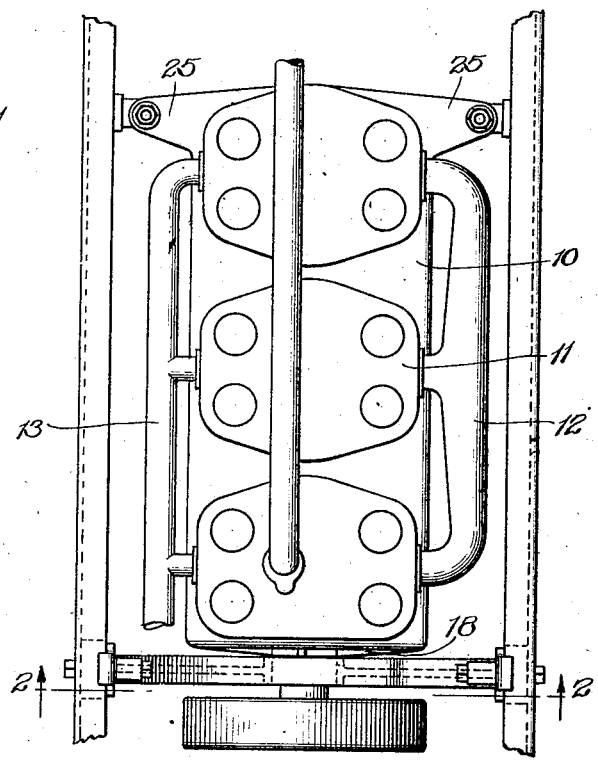
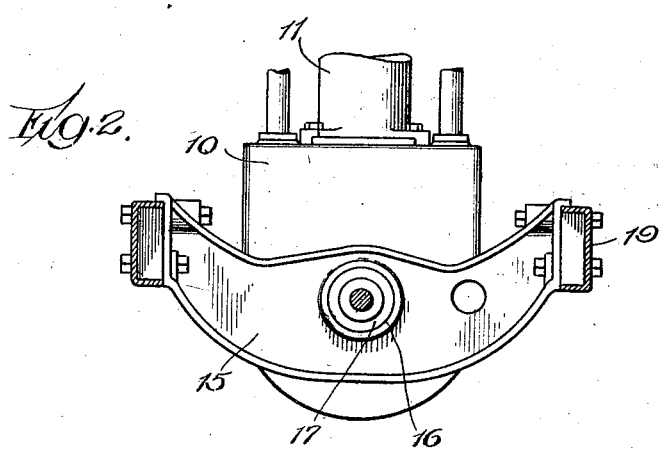
Inventor
Charles A. Tilt
By Sheridan, Jones, Sheridan and Smith
Attys.

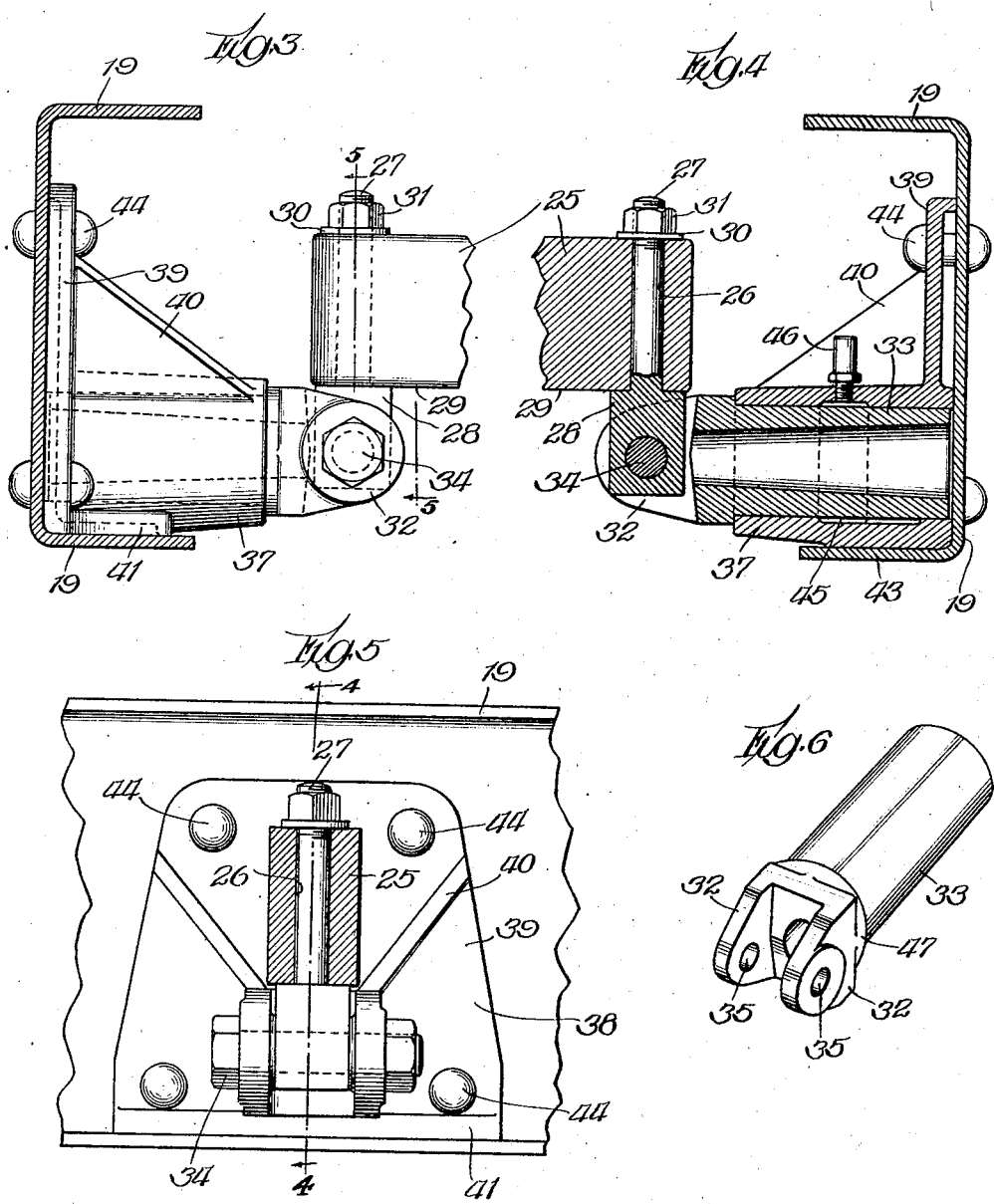

Patented May 15, 1923.

1,455,365

UNITED STATES PATENT OFFICE.

CHARLES A. TILT, OF CHICAGO, ILLINOIS.

AUTOMOBILE ENGINE SUSPENSION.

Application filed April 27, 1921. Serial No. 465,055.

*To all whom it may concern:*

Be it known that I, CHARLES A. TILT, a citizen of the United States, residing at Chicago, in the county of Cook and State of Illinois, have invented certain new and useful Improvements in Automobile Engine Suspensions, of which the following is a specification.

This invention relates to improved means for mounting an automobile or motor truck engine on a frame and its purpose is to provide an improved connecting device adapted to permit the necessary relative movements of the engine base with respect to the frame members.

The various objects and advantages of the invention will appear from the following specification taken in connection with the the accompanying drawings in which one embodiment is illustrated.

In the drawings—

Figure 1 shows a top plan view of an automobile engine connected to the side frame members by the improved connecting means which constitutes the present invention;

Fig. 2 shows a transverse sectional view on the line 2—2 of Fig. 1, looking in the direction of the arrows;

Fig. 3 shows a sectional view on the line 3—3 of Fig. 1, looking in the direction of the arrows;

Fig. 4 shows a sectional view on the line 4—4 of Fig. 5;

Fig. 5 shows a vertical section on the line 5—5 of Fig. 3; and

Fig. 6 is a perspective view of one of the trunnions forming a part of the connecting device.

The invention is illustrated in connection with an automobile engine comprising an engine base 10, cylinders 11, intake manifold 12, and exhaust manifold 13. The forward end of the engine is supported by a cross member 15 which is provided at its ends with flanges 15ª having apertures therethrough by which the ends of the member are secured by bolts or rivets 15ᵇ to the side frame members 19 of the automobile. The central part of the cross member 15 is provided with an aperture 16 which forms a journal bearing for a trunnion 17 which is mounted on the forward end of the gear casing cover 18. The forward end of the engine base thus has a rotary and slidable connection with the cross member 15, so that this part of the structure is able to accommodate itself to the movements of the rear end of the engine base.

At the rear end of the engine, the base 10 is provided with two laterally extending arms 25 and these arms are provided with vertically extending apertures 26 adapted to be engaged by bolts 27. The lower end of each bolt 27 has an enlarged head 28 which seats against the lower surface 29 of the connected arm 25 and the upper threaded extremity of the bolt is engaged by a washer 30 and a nut 31. The enlarged head 28 of the bolt extends between two ears 32 which are formed on the cylindrical trunnion 33. A bolt 34 extends transversely through the aperture 35 in the ears 32 and through an alining aperture in the head 28, thus forming a pivotal connection between the bolt 27 and the trunnion 33.

The trunnion 33 is adapted to form a sliding and rotatable engagement with a cylindrical hub or bearing member 37 which is formed as an integral part of a bracket 38. The hub extends at right angles to the plate 39 which forms the body portion of the bracket and reinforcing ribs 40 extend between the plate 39 and the upper side of the hub, as shown particularly in Figs. 3 and 5. The flange 41 is formed integrally with the lower part of the hub 33 and with the lower edge of the plate 39 and is adapted to rest upon the lower flange 43 of the side frame member 19. The plate 39 seats against the web of the member 19 and is secured thereto by bolts or rivets 44. The bore of the hub 33 is provided with an annular oil groove 45 and a grease cup 46 is adapted to furnish lubricant to this oil groove and to the bearing surfaces of the trunnion 33 and the hub. At the outer end of the trunnion an annular shoulder 47 is provided to engage the outer end of the hub 37 and limit the outward movement of the trunnion. Each of the arms 25 of the engine base is connected to one of the side frame members by the connecting device described above and in this way the necessary movement between the engine base and the side frame members is permitted. The pivotal connection between the vertical bolt 27 and the trunnion 33 permits relative movement about a horizontal longitudinal axis; the sliding connection between the bearing and its hub permits movement of the engine base transversely of the side frame; and the rotatable engagement of the trunnion and the hub permits a tilting movement of the engine base with respect to the frame. Under unusual strain, the engine base may also turn about the vertical bolts 27. A universal movement is thus provided with a very simple form of connection.

Although I have shown and described one form of the invention for purposes of illustration, it will be understood that it may be constructed in various other forms without departing from the scope of the appended claims.

What I claim is:—

1. In combination, an engine base, a frame member, a bracket attached to said frame member, a trunnion rotatably and slidably engaging said bracket, and means for forming a pivotal connection between said trunnion and said engine base.

2. In combination, an engine base, a side frame member, a bracket secured to said side frame member, a trunnion mounted in said bracket to slide transversely of said frame member and to rotate about its axis, and means for connecting said trunnion to said engine base to permit relative angular movement thereof about an axis parallel to said side frame member.

3. In combination, an engine base, a side frame member, a bracket secured to said side frame member and having an integral hub projecting inwardly therefrom, a trunnion mounted in said hub, and a bolt pivoted to said trunnion and extending upwardly through said engine base.

4. In combination, an engine base, a side frame member, a bracket secured to said side frame member and having an integral hub projecting inwardly therefrom, a trunnion mounted in said hub, and a bolt having a head connected to said trunnion and engaging the underside of said engine base, the body of said bolt extending upwardly through said engine base.

5. In combination, a side frame member, a bracket secured to said side frame member and having an integral hub extending inwardly therefrom, a trunnion slidably and rotatably engaging said hub and having a pair of ears formed on its projecting end, a bolt having a head extending between said ears and pivotally connected thereto, and an engine base having an aperture adapted to receive said bolt.

6. In combination, a side frame member, a bracket secured to said side frame member and having an integral hub extending inwardly therefrom, a trunnion engaging said hub and having a pair of ears formed on its projecting end, a bolt having a head extending between said ears and pivotally connected thereto, and an engine base having a vertical aperture to receive said bolt and resting on the head of said bolt.

7. In combination, a channel side frame member, a bracket mounted in said side frame member, said bracket having a flange resting on the lower flange of said side frame member and having a plate coacting with the body portion thereof, means for securing said plate to said member, a hub formed integrally with said plate and said first mentioned flange, a trunnion rotatably and slidably engaging said hub, an engine base, and means for connecting said trunnion to said engine base.

In testimony whereof, I have subscribed my name.

CHARLES A. TILT.